(12) United States Patent
Baccouche et al.

(10) Patent No.: US 8,205,921 B2
(45) Date of Patent: Jun. 26, 2012

(54) EXTRUDED ALUMINUM BUMPER HAVING TRIGGERS

(75) Inventors: Mohamed Ridha Baccouche, Ann Arbor, MI (US); Saied Nusier, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 12/712,235

(22) Filed: Feb. 25, 2010

(65) Prior Publication Data

US 2011/0204663 A1   Aug. 25, 2011

(51) Int. Cl.
*B60R 19/18* (2006.01)

(52) U.S. Cl. ............... 293/102; 293/122; 296/187.09

(58) Field of Classification Search ............ 296/187.03, 296/187.09, 187.1; 293/102, 121, 122, 133, 293/120
See application file for complete search history.

(56) References Cited

U.S. PATENT DOCUMENTS

| | | | |
|---|---|---|---|
| 1,647,627 A | 11/1927 | Horowitz | |
| 3,814,470 A | 6/1974 | Kicher et al. | |
| 3,843,182 A | 10/1974 | Walls et al. | |
| 3,897,095 A | 7/1975 | Glance et al. | |
| 4,465,312 A | 8/1984 | Werner | |
| 5,201,912 A | 4/1993 | Terada et al. | |
| 5,340,178 A * | 8/1994 | Stewart et al. | 293/122 |
| 5,577,796 A | 11/1996 | Clausen | |
| 5,727,826 A | 3/1998 | Frank et al. | |
| 6,000,738 A * | 12/1999 | Stewart et al. | 293/102 |
| 6,808,215 B2 | 10/2004 | Sakuma et al. | |
| 6,986,536 B1 | 1/2006 | Heatherington et al. | |
| 6,988,753 B1 | 1/2006 | Omura et al. | |
| 7,004,519 B2 | 2/2006 | Roussel et al. | |
| 7,255,378 B1 * | 8/2007 | Baccouche et al. | 293/146 |
| 7,354,030 B2 * | 4/2008 | Murayama et al. | 267/140 |
| 7,494,165 B2 * | 2/2009 | Evans et al. | 293/102 |
| 7,607,705 B1 * | 10/2009 | Mast et al. | 293/117 |
| 7,837,244 B2 * | 11/2010 | Hashimura | 293/102 |
| 7,854,453 B2 * | 12/2010 | Tanabe | 293/102 |
| 2001/0024051 A1 | 9/2001 | Kariatsumari et al. | |
| 2001/0054827 A1 * | 12/2001 | Sundgren et al. | 293/102 |

* cited by examiner

*Primary Examiner* — Jason S Morrow
(74) *Attorney, Agent, or Firm* — Shook, Hardy & Bacon LLP

(57) ABSTRACT

An energy absorbing extruded bumper for a vehicle is formed from a lightweight metal, preferably aluminum base alloy material. The extruded bumper includes an outer wall, an inner wall, a top wall connecting the outer and inner walls, and a bottom wall connecting the outer and inner walls. Extending between the outer and inner walls are two or more s-curved trigger stiffeners. The trigger stiffeners include an upper s-curved trigger stiffener connecting the outer and inner walls and a lower s-curved trigger stiffener connecting the outer and inner walls. The lower s-curved trigger stiffener is spaced apart from the upper s-curved trigger stiffener.

18 Claims, 5 Drawing Sheets

EXTRUDED ALUMINUM BUMPER HAVING TRIGGERS

TECHNICAL FIELD

The disclosed invention relates to an extruded aluminum bumper for an automotive vehicle. More particularly, the disclosed invention relates to a lightweight, extruded aluminum bumper with triggers. The extruded aluminum bumper of the disclosed invention provides performance at least equivalent to conventional bumper configurations.

BACKGROUND OF THE INVENTION

Bumpers are mounted at the forward and rearward extremities of a vehicle to protect the chassis of the vehicle from minor impacts. The bumper is mounted to the lower frame rails of the vehicle chassis for support thereof and functions to withstand minor impacts by collapsing to absorb the energy encountered through the impact.

For conventional bumpers, enhancements to the cross-sectional configuration in the form of reinforcement inserts provide higher energy absorption qualities for those reinforced areas of the bumper, thus achieving some relative improvement in the collapsing of the bumper structure. Such reinforcements are conventionally placed at the attachment points between the bumper structure and the lower frame rails to allow for a greater absorption and dispersion of impact energy by the bumper before this energy is transferred to the lower frame rail into the vehicle chassis.

A more recent development which has been provided to both reduce weight and cost without compromising crash performance has been the introduction of the extruded aluminum bumper. However, known extruded bumpers generate peak and average crash loads having differences so great that the engineer is prevented from designing an optimum bumper system with a crash energy management level of the same order as that of the longitudinal rail member supporting the bumper. If the average crash load carrying capacity of the bumper beam could be increased to the level of the supporting longitudinal member, the bumper peak crash load would cause the supporting rail to collapse prior to triggering the bumper beam crash. This is an undesirable crash mode because of the non-sequential collapse of the front end structural systems.

Accordingly, it is desirable to provide a lightweight bumper configuration that would be capable of crash performance characteristics of heavier conventional bumpers that are formed with reinforcement inserts while allowing the bumper to achieve an optimum crash energy level with a crash load equal to that of the supporting longitudinal rails and without the risk of non-sequential collapse. In addition, reducing the weight of the structure without sacrificing performance of the bumper can provide manufacturing cost savings.

SUMMARY OF THE INVENTION

The disclosed invention provides an energy absorbing extruded bumper for a vehicle. The extruded bumper is formed from a lightweight metal, preferably from aluminum base alloy material. The extruded bumper includes an outer wall, an inner wall, a top wall connecting the outer and inner walls, and a bottom wall connecting the outer and inner walls.

Extending between the outer and inner walls are two or more s-curved trigger stiffeners. The trigger stiffeners include an upper s-curved trigger stiffener connecting the outer and inner walls and a lower s-curved trigger stiffener connecting the outer and inner walls. The lower s-curved trigger stiffener is spaced apart from the upper s-curved trigger stiffener.

Preferably but not necessarily the upper s-curved trigger stiffener is inverted with respect to the lower s-curved trigger stiffener such that the inward-curving sections of the s-curves of each trigger stiffener are in opposition and the outward-curving sections of the s-curves of each trigger stiffener are in opposition. Also preferably but not necessarily the inward-curving sections of the s-curves are adjacent the outer wall and the outward-curving sections of the s-curves are adjacent the inner wall.

The inward-curving sections of the s-curves have a thickness and the areas of the trigger stiffeners adjacent the inward-curving sections have a thickness. Preferably but not exclusively the thickness of the inward-curving sections of the s-curves is greater than the thickness of the adjacent areas. Similarly and also preferably but not exclusively the outward-curving sections of the s-curves have a thickness and the areas of the trigger stiffeners adjacent the outward-curving sections have a thickness, the thickness of the outward-curving sections of the s-curves being greater than the thickness of the adjacent areas.

The extruded bumper of the disclosed invention provides a structure that is durable and lightweight, is easy to assemble and is inexpensive to make without sacrificing crash performance.

Because the bumper of the disclosed invention is extruded the cross-sectional configuration of the bumper beam can be uniformly manufactured along the entire length of the bumper beam.

In addition, the s-curved trigger stiffeners can have thicker areas such as at the inward-curving sections and outward-curving sections while the adjacent areas are thinner, thus providing appropriate thickness only at the locations where such material thickness is needed without requiring the utilization of reinforcement inserts.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 4 is a graph illustrating the results of impact studies showing load vs. displacement characteristics of a prior art extruded bumper and of the extruded bumper of the disclosed invention.

DETAILED DESCRIPTION OF THE PREFERRED EMBODIMENT

Figure 1:
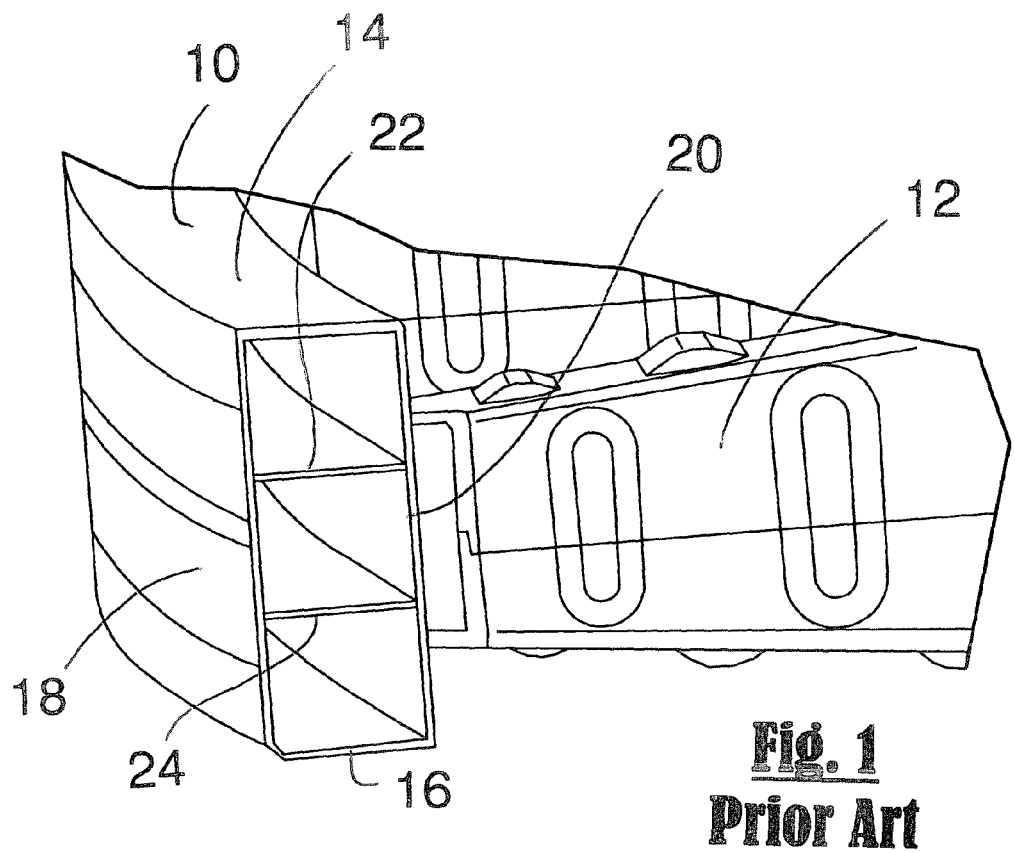
FIG. 1 is a perspective fragmentary view of a portion of a prior art extruded bumper in its initial, pre-impact condition shown in partial cross-section.

In the following figures, the same reference numerals will be used to refer to the same components. In the following description, various operating parameters and components are described for different constructed embodiments. These specific parameters and components are included as examples and are not meant to be limiting.

With respect to FIG. 1, a perspective fragmentary view of a portion of a prior art extruded bumper, generally illustrated as 10, is shown. The bumper 10, shown in partial cross-section, is illustrated in its initial, pre-impact condition.

As is known in the art, the extruded bumper 10 is attached to a vehicle (not shown) by a pair of supporting longitudinal rails of which one, longitudinal rail 12, is illustrated.

According to known design, the bumper 10 includes a top wall 14, a bottom wall 16, a front wall 18, and a rear wall 20. Extending between the front wall 18 and the rear wall 20 is an upper stiffener 22 and a lower stiffener 24. As is known in the art the upper stiffener 22 and the lower stiffener 24 have no trigger area.

Figure 2:
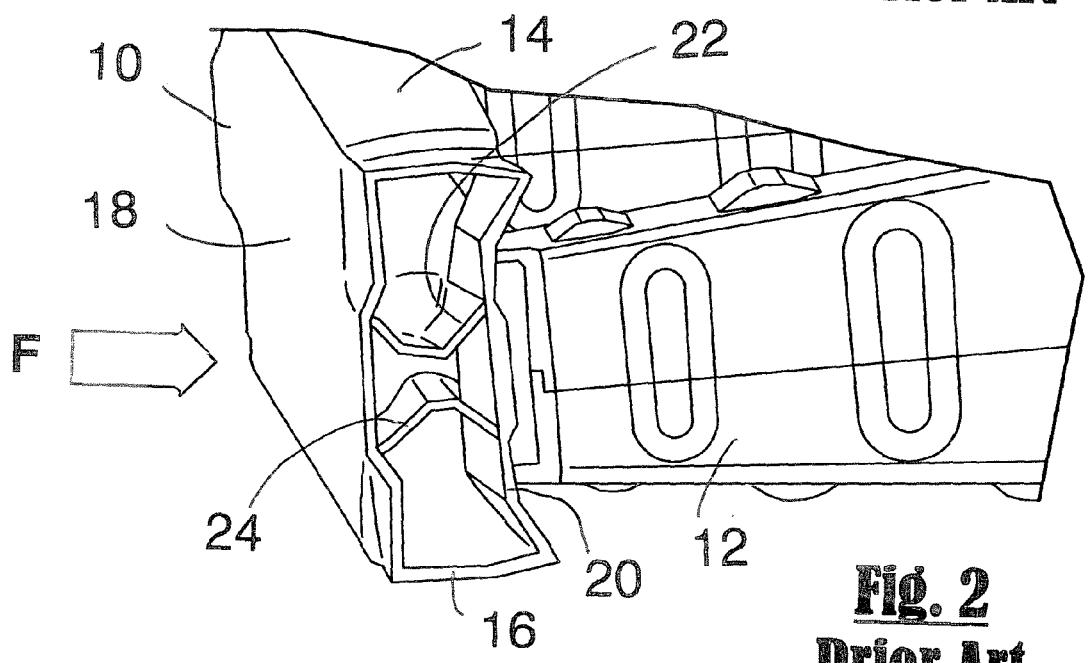
FIG. 2 is the same view as FIG. 1 but illustrating early stage deformation of the prior art bumper when a load is applied.
Figure 3:
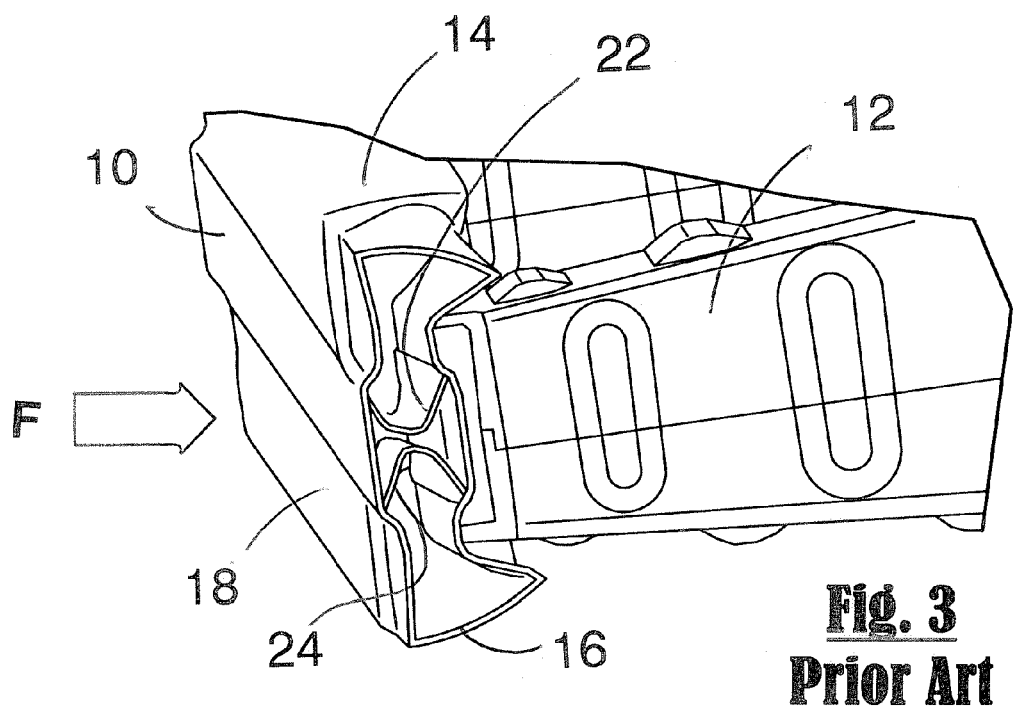
FIG. 3 is the same view as FIG. 2 but illustrating late stage deformation of the prior art bumper when a load is applied.

The difficulty with known approaches to extruded bumpers having stiffeners but no trigger area is apparent with reference to FIGS. 2 and 3 which illustrate the results of an impacting force on the bumper. With reference first to FIG. 2, an impacting force, illustrated as F, is shown acting upon the extruded bumper 10. The deformation shown in FIG. 2 illustrates how the bumper would appear about 17 msec after the impact of the force F. As can be seen, the upper stiffener 22 and the lower stiffener 24 are beginning to deform.

In FIG. 3 the impacting force F is shown having acted further upon the extruded bumper 10. The deformation shown in FIG. 3 illustrates how the bumper would appear about 34 msec after the impact of the force F. As can be seen, the upper stiffener 22 and the lower stiffener 24 have substantially deformed.

The prior art bumper set forth in FIGS. 1 through 3 illustrates the challenges inherent in such designs. As illustrated in FIG. 4, the peak crashing load of the non-triggered, extruded bumper 10 (a typical extruded aluminum bumper), illustrated as broken line 26, is approximately 90% higher than its average crash load. (Peak and average crash loads are taken at front rails centerlines.) As illustrated, load (in Klbf) is shown on the y-axis and displacement (in inches) is shown on the x-axis.

The extruded bumper of disclosed invention overcomes the problems of known extruded bumpers by providing an extruded aluminum bumper having dual triggering. A first preferred embodiment of the extruded bumper of the disclosed invention is set forth in FIGS. 5 through 8. It is to be noted that the bumper illustrated in these figures is intended as being exemplary and is not intended as being limiting as variations of the disclosed bumper may be formulated without deviating from either the spirit or the scope of the disclosed invention.

Figure 5:
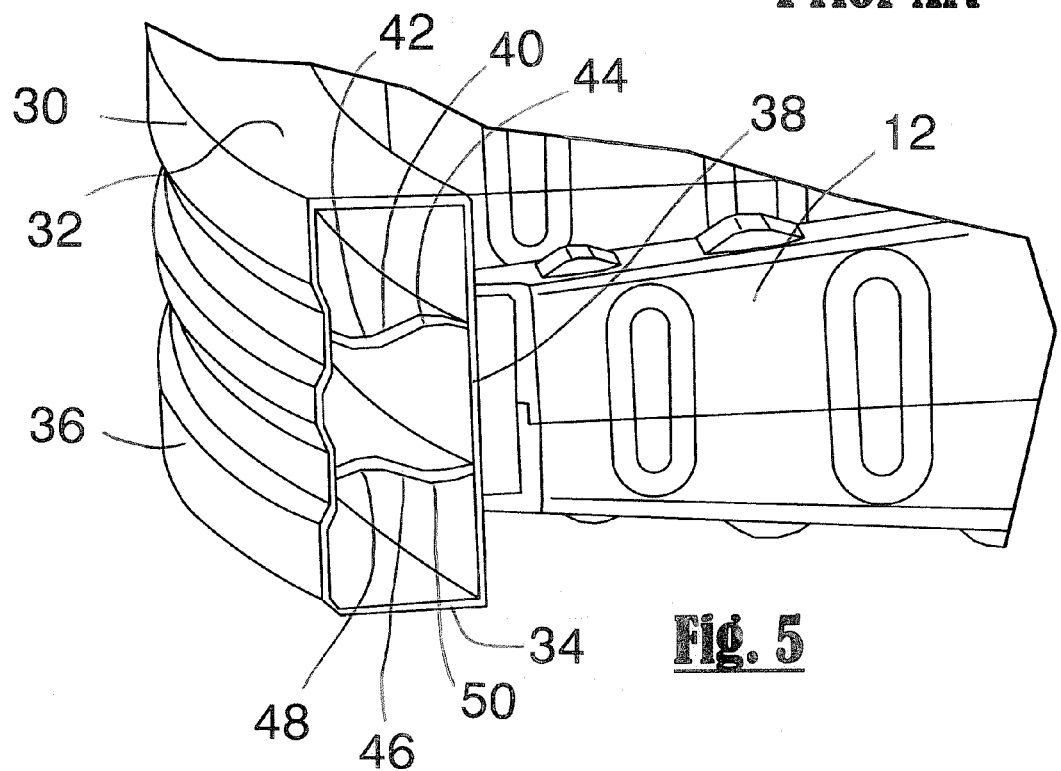
FIG. 5 is a perspective fragmentary view of a portion of a first preferred embodiment of the extruded bumper of the disclosed invention in its initial, pre-impact condition shown in partial cross-section.

With reference to FIG. 5, an extruded bumper, generally illustrated as 30, is shown. As in the prior art bumper 10 shown in FIGS. 1 through 3 and discussed in relation thereto, the extruded bumper 30 is attached to a vehicle (not shown) by a pair of supporting longitudinal rails of which one, longitudinal rail 12, is illustrated.

The extruded bumper 30 is preferably composed of base alloy aluminum although it is envisioned that the bumper 30 may also be formed from other extrudable, lightweight but strong materials as may be known to those skilled in the art.

The extruded bumper 30 includes a top wall 32, a bottom wall 34, a front wall 36, and a rear wall 38. The dual extruded dual triggering mechanism of the disclosed invention is formed from an upper trigger 40 extending between the front wall 36 and the rear wall 38 and a lower trigger 46 extending between the front wall 36 and the rear wall 38.

As illustrated in FIG. 5, the upper trigger 40 and the lower trigger 46 each has a cross-section generally defined as an s-curve. Particularly, the upper trigger 40 has a inward-curving section 42 and an outward-curving section 44. The lower trigger 46 has an inward-curving section 48 and an outward-curving section 50. Preferably but not absolutely the inward-curving sections 42 and 48 may be adjacent the front wall 36 of the bumper 30 and the outward-curving sections 44 and 50 may be adjacent the rear wall 38. Additional triggers may be incorporated into the illustrated design.

Figure 6:
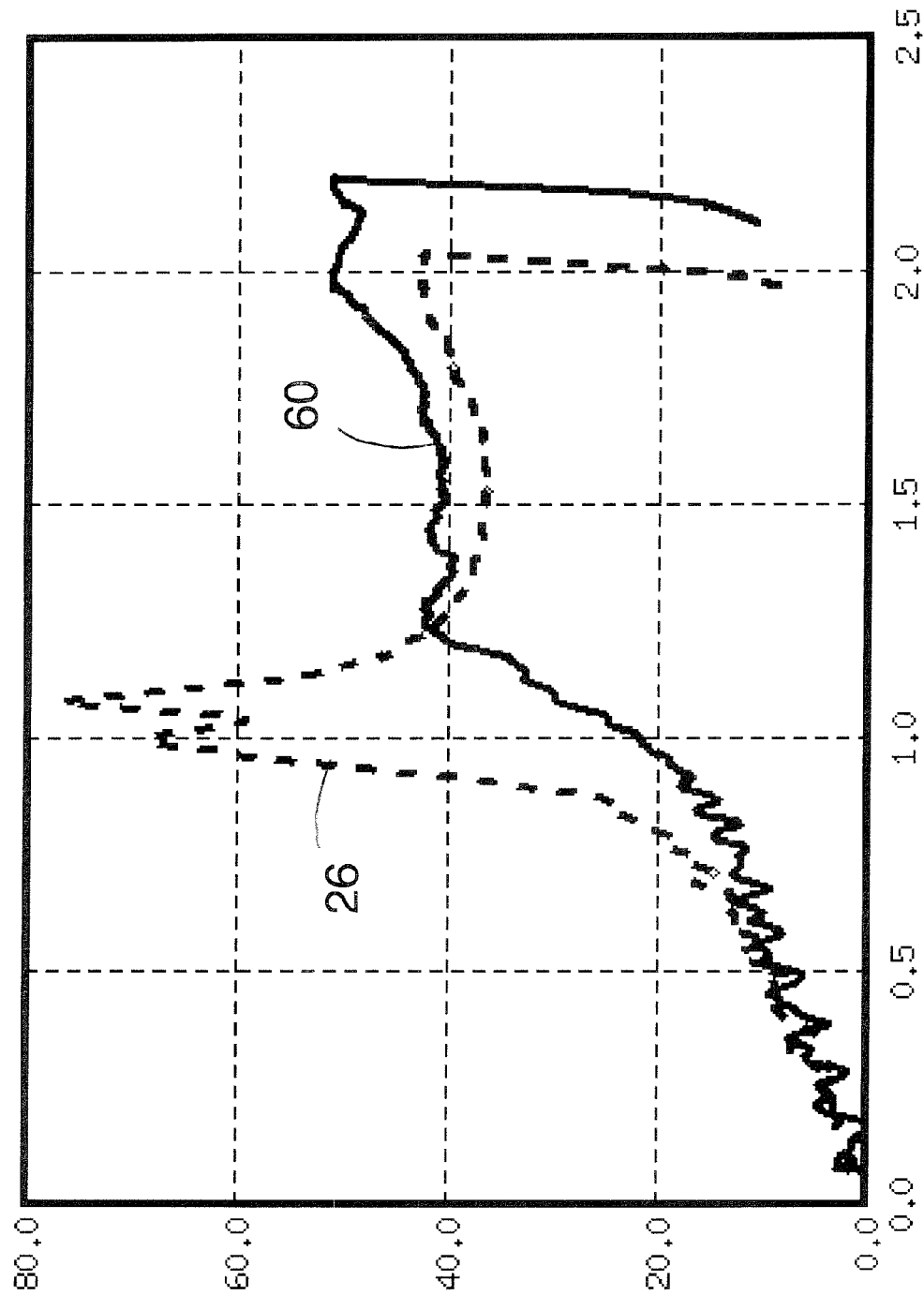
FIG. 6 is the same view as FIG. 5 but illustrating early stage deformation of the bumper of the disclosed invention when a load is applied.
Figure 7:
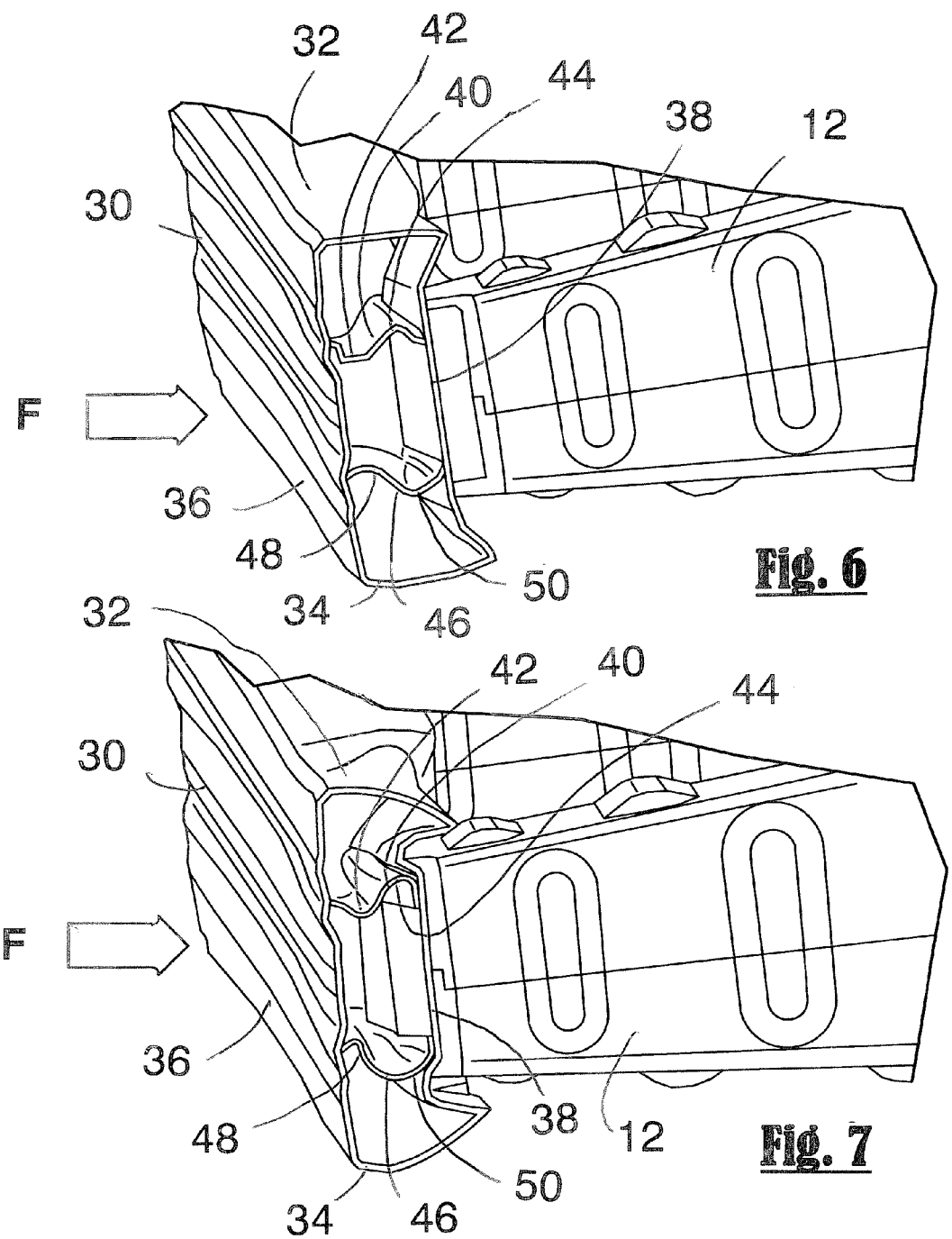
FIG. 7 is the same view as FIG. 6 but illustrating late stage deformation of the bumper of the disclosed invention when a load is applied.

The favorable results of an impacting a force are shown in FIGS. 6 and 7. With reference first to FIG. 6, an impacting force, illustrated as F, is shown acting upon the extruded bumper 30. The deformation shown in FIG. 6 illustrates how the bumper would appear about 17 msec after the impact of the force F. As can be seen, the upper trigger 40 and the lower trigger 46 are beginning to deform.

In FIG. 7 the impacting force F is shown having acted further upon the extruded bumper 30. The deformation shown in FIG. 7 illustrates how the bumper 30 would appear about 34 msec after the impact of the force F. The upper trigger 42 and the lower trigger 46 have substantially deformed.

Figure 8:
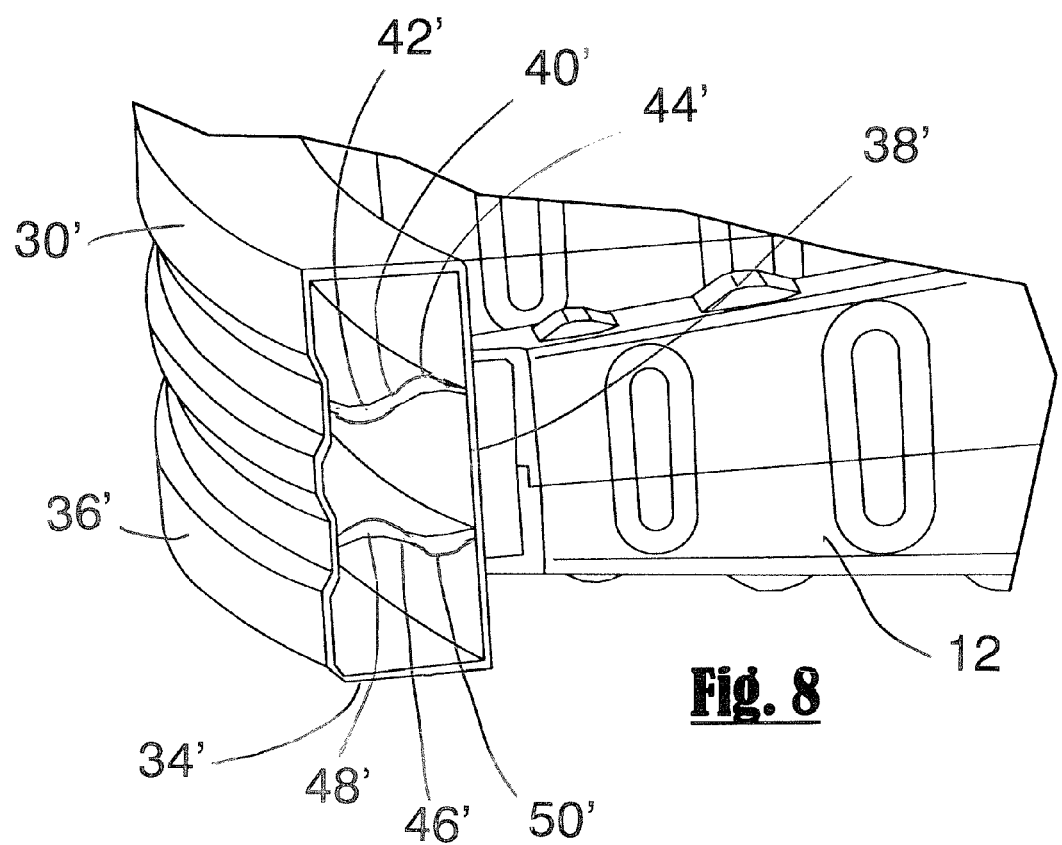
FIG. 8 is a perspective fragmentary view of a portion of a second preferred embodiment of the extruded bumper of the disclosed invention in its initial, pre-impact condition shown in partial cross-section.

As a variant to the extruded bumper shown in FIGS. 5 through 7 and discussed in relation thereto, a second preferred embodiment of the disclosed invention is set forth in FIG. 8. With reference thereto, an extruded bumper, illustrated as 30', is shown. According to this alternate embodiment, the extruded bumper 30' includes a top wall 32', a bottom wall 34', a front wall 36', and a rear wall 38'. Similar to the first preferred embodiment shown in FIGS. 5 through 7, the dual extruded dual triggering mechanism of the second preferred embodiment includes an upper trigger 40' extending between the front wall 36' and the rear wall 38' and a lower trigger 46' extending between the front wall 36' and the rear wall 38'.

As with the first preferred embodiment of the disclosed invention, the upper trigger 40' and the lower trigger 46' of the second preferred embodiment each has a cross-section generally defined as an s-curve. The upper trigger 40' has a inward-curving section 42' and an outward-curving section 44'. The lower trigger 46' has an inward-curving section 48' and an outward-curving section 50'. One, some or all of the inward-curving sections 42' and 48' and the outward-curving sections 44' and 50' may be thicker than the adjacent area of the curving sections as illustrated in FIG. 8. If thicker, the degree of thickness may be varied from one curved section to another or may be constant among the curved sections.

Regardless of the embodiment, the extruded bumper of the disclosed invention allows the bumper to achieve an optimum crash energy level with a crash load equal to that of the supporting longitudinal rails and without the risk of non-sequential collapse. This outcome is not likely without the embedded dual triggering stiffeners mechanism shown above in FIGS. 5 through 8 and discussed in relation thereto. As illustrated in FIG. 4 and referring to the solid line 60, the average crash load in the bumper of the disclosed invention without the associated crash peak of the non-triggered bumper 10 of the prior art (line 20) has a dual benefit. First, the crash load configuration allows the extruded bumper of the disclosed invention to achieve an optimized square stroke in a low speed rigid barrier test. Second, the crash load configuration allows the bumper to manage higher crash energy under high speed, full frontal and offset impacts.

Accordingly, among the advantages of the disclosed extruded bumper having the dual triggering stiffener mechanism shown in FIGS. 5 through 8 and described in conjunction therewith are an optimized square stroke under low speed rigid barrier impact, higher crash energy management under high speed impact, and a controlled peak-to-average crash load ratio.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An extruded bumper for a vehicle comprising:
   an outer wall;
   an inner wall;
   a top wall connecting said outer and inner walls;
   a bottom wall connecting said outer and inner walls;
   an upper s-curved trigger stiffener connecting said outer and inner walls; and
   a lower s-curved trigger stiffener connecting said outer and inner walls, said lower s-curved trigger stiffener being spaced apart from said upper s-curved trigger stiffener, said upper s-curved trigger stiffener being inverted with respect to said lower s-curved trigger stiffener such that respective inward-curving sections of each of the s-curves of each trigger stiffener are in opposition and respective outward-curving sections of each of the s-curves of each trigger stiffener are in opposition.

2. The extruded bumper of claim 1 wherein the bumper is extruded from a lightweight metal.

3. The extruded bumper of claim 1 wherein the bumper is extruded from aluminum base alloy material.

4. The extruded bumper of claim 1 wherein the respective inward-curving sections of said s-curves are adjacent said outer wall and the respective outward-curving sections of said s-curves are adjacent said inner wall.

5. The extruded bumper of claim 1 wherein the respective inward-curving sections of said s-curves have a thickness and adjacent areas of said trigger stiffeners, which are adjacent the respective inward-curving sections, have a thickness, said thickness of the respective inward-curving sections of said s-curves being greater than said thickness of said adjacent areas.

6. The extruded bumper of claim 5 wherein the respective outward-curving sections of said s-curves have a thickness and adjacent areas of said trigger stiffeners, which are adjacent the respective outward-curving sections, have a thickness, said thickness of the respective outward-curving sections of said s-curves being greater than said thickness of said adjacent areas.

7. A bumper structure for use with a vehicle having a frame comprising:
   a pair of supporting rails attached to the frame;
   a bumper that is attached to the pair of supporting rails and that comprises an outer wall, an inner wall, a top wall, a bottom wall, a first s-curved trigger stiffener connecting said outer and inner walls, and a second s-curved trigger stiffener connecting said outer and inner walls,
   wherein said second s-curved trigger stiffener is spaced apart from said first s-curved trigger stiffener, and
   wherein said first s-curved trigger stiffener is inverted with respect to said second s-curved trigger stiffener, such that respective inward-curving sections of each of the s-curves of each trigger stiffener are in opposition and respective outward-curving sections of each of the s-curves of each trigger stiffener are in opposition.

8. The extruded bumper of claim 7 wherein the bumper is extruded from a lightweight metal.

9. The extruded bumper of claim 7 wherein the bumper is extruded from aluminum base alloy material.

10. The extruded bumper of claim 7 wherein the respective inward-curving sections of said s-curves are adjacent said outer wall and the respective outward-curving sections of said s-curves are adjacent said inner wall.

11. The extruded bumper of claim 7 wherein the respective inward-curving sections of said s-curves have a thickness and adjacent areas of said trigger stiffeners, which are adjacent the respective inward-curving sections, have a thickness, said thickness of the respective inward-curving sections of said s-curves being greater than said thickness of said adjacent areas.

12. The extruded bumper of claim 11 wherein the respective outward-curving sections of said s-curves have a thickness and adjacent areas of said trigger stiffeners, which are adjacent the respective outward-curving sections, have a thickness, said thickness of the respective outward-curving sections of said s-curves being greater than said thickness of said adjacent areas.

13. An extruded bumper for a vehicle comprising:
   a first wall;
   a second wall;
   a third wall connecting said first and second walls;
   a fourth wall connecting said first and second walls;
   a first s-curved trigger stiffener connecting said first and second walls; and
   a second s-curved trigger stiffener connecting said first and second walls, said second s-curved trigger stiffener being spaced apart from said first s-curved trigger stiffener, wherein said first s-curved trigger stiffener is inverted with respect to said second s-curved trigger stiffener.

14. The extruded bumper of claim 13 wherein the bumper is extruded from aluminum.

15. The extruded bumper of claim 13 wherein respective inward-curving sections of the s-curve of each trigger stiffener are in opposition and respective outward-curving sections of the s-curves of each trigger stiffener are in opposition.

16. The extruded bumper of claim 15 wherein the respective inward-curving sections of said s-curves are adjacent said first wall and the respective outward-curving sections of said s-curves are adjacent said second wall.

17. The extruded bumper of claim 15 wherein the respective inward-curving sections of said s-curves have a thickness and adjacent areas of said trigger stiffeners, which are adjacent the respective inward-curving sections, have a thickness, said thickness of the respective inward-curving sections of said s-curves being greater than said thickness of said adjacent areas.

18. The extruded bumper of claim 17 wherein the respective outward-curving sections of said s-curves have a thickness and adjacent areas of said trigger stiffeners, which are adjacent the respective inward-curving sections, have a thickness, said thickness of the respective inward-curving sections of said s-curves being greater than said thickness of said adjacent areas.

* * * * *